United States Patent
Martinez et al.

(10) Patent No.: US 10,146,942 B2
(45) Date of Patent: Dec. 4, 2018

(54) METHOD TO PROTECT BIOS NVRAM FROM MALICIOUS CODE INJECTION BY ENCRYPTING NVRAM VARIABLES AND SYSTEM THEREFOR

(71) Applicant: Dell Products, LP, Round Rock, TX (US)

(72) Inventors: Ricardo L. Martinez, Leander, TX (US); Allen C. Wynn, Round Rock, TX (US); Richard M. Tonry, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 52 days.

(21) Appl. No.: 14/630,413

(22) Filed: Feb. 24, 2015

(65) Prior Publication Data

US 2016/0246964 A1 Aug. 25, 2016

(51) Int. Cl.
| | | |
|---|---|---|
| G06F 21/56 | (2013.01) | |
| G06F 21/57 | (2013.01) | |
| H04L 9/06 | (2006.01) | |
| G06F 13/42 | (2006.01) | |
| G06F 12/14 | (2006.01) | |

(52) U.S. Cl.
CPC ........ G06F 21/572 (2013.01); G06F 13/4282 (2013.01); H04L 9/06 (2013.01); H04L 9/0618 (2013.01); *G06F 12/1408* (2013.01); *G06F 2212/1052* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 5,933,620 | A * | 8/1999 | Lee | G06F 11/006 703/13 |
| 7,073,064 | B1 * | 7/2006 | Angelo | G06F 21/575 710/10 |
| 9,064,135 | B1 * | 6/2015 | Poo | G06F 21/72 |
| 2001/0049794 | A1 * | 12/2001 | Chen | G06F 21/566 726/26 |
| 2003/0018892 | A1 | 1/2003 | Tello | |
| 2003/0041254 | A1 * | 2/2003 | Challener | G06F 21/572 713/193 |
| 2003/0084332 | A1 * | 5/2003 | Krasinski | G06F 21/10 726/26 |
| 2006/0174109 | A1 * | 8/2006 | Flynn | G06F 9/4406 713/164 |
| 2008/0022099 | A1 * | 1/2008 | Kawano | G06F 21/62 713/168 |
| 2008/0052777 | A1 * | 2/2008 | Kawano | H04L 9/088 726/18 |
| 2008/0066075 | A1 * | 3/2008 | Nutter | G06F 9/485 718/107 |

(Continued)

*Primary Examiner* — Trang T Doan
(74) *Attorney, Agent, or Firm* — Larson Newman, LLP

(57) ABSTRACT

Data to be stored at a firmware memory is received. A random symmetric encryption key is generated. The data is encrypted using the generated key to provide encrypted data. The encrypted data and the encryption key are both stored at the firmware memory.

19 Claims, 3 Drawing Sheets

(56) References Cited

U.S. PATENT DOCUMENTS

| | | | |
|---|---|---|---|
| 2008/0077807 A1 | 3/2008 | Hicks | |
| 2008/0226081 A1* | 9/2008 | Terao | G06F 21/62 380/277 |
| 2008/0229114 A1* | 9/2008 | Okabe | G06F 21/57 713/189 |
| 2009/0060197 A1* | 3/2009 | Taylor | H04L 9/0618 380/277 |
| 2009/0157551 A1* | 6/2009 | Bellwood | G06Q 50/22 705/50 |
| 2009/0319782 A1* | 12/2009 | Lee | G06F 21/34 713/156 |
| 2011/0099366 A1* | 4/2011 | Kalliola | G06F 21/606 713/153 |
| 2011/0161675 A1* | 6/2011 | Diard | G06F 21/6281 713/189 |
| 2011/0225431 A1* | 9/2011 | Stufflebeam, Jr. | G06F 21/62 713/190 |
| 2012/0017097 A1* | 1/2012 | Walrath | G06F 21/602 713/190 |
| 2012/0151199 A1* | 6/2012 | Shriver | G06F 21/575 713/2 |
| 2012/0216049 A1* | 8/2012 | Boivie | G06F 21/57 713/189 |
| 2012/0324238 A1* | 12/2012 | Senda | G06F 21/57 713/189 |
| 2013/0311781 A1* | 11/2013 | Wang | H04L 9/3247 713/176 |
| 2014/0082373 A1* | 3/2014 | Colnot | G06F 21/575 713/193 |
| 2014/0281501 A1* | 9/2014 | Korkishko | H04L 63/123 713/156 |
| 2014/0281577 A1* | 9/2014 | Nicholes | G06F 21/71 713/189 |
| 2015/0006912 A1* | 1/2015 | Mansi | G06F 21/84 713/193 |
| 2015/0154031 A1* | 6/2015 | Lewis | G06F 9/4406 713/2 |

* cited by examiner

METHOD TO PROTECT BIOS NVRAM FROM MALICIOUS CODE INJECTION BY ENCRYPTING NVRAM VARIABLES AND SYSTEM THEREFOR

FIELD OF THE DISCLOSURE

This disclosure generally relates to information handling systems, and more particularly relates to protecting BIOS NVRAM from malicious code injection by encrypting NVRAM variables at an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
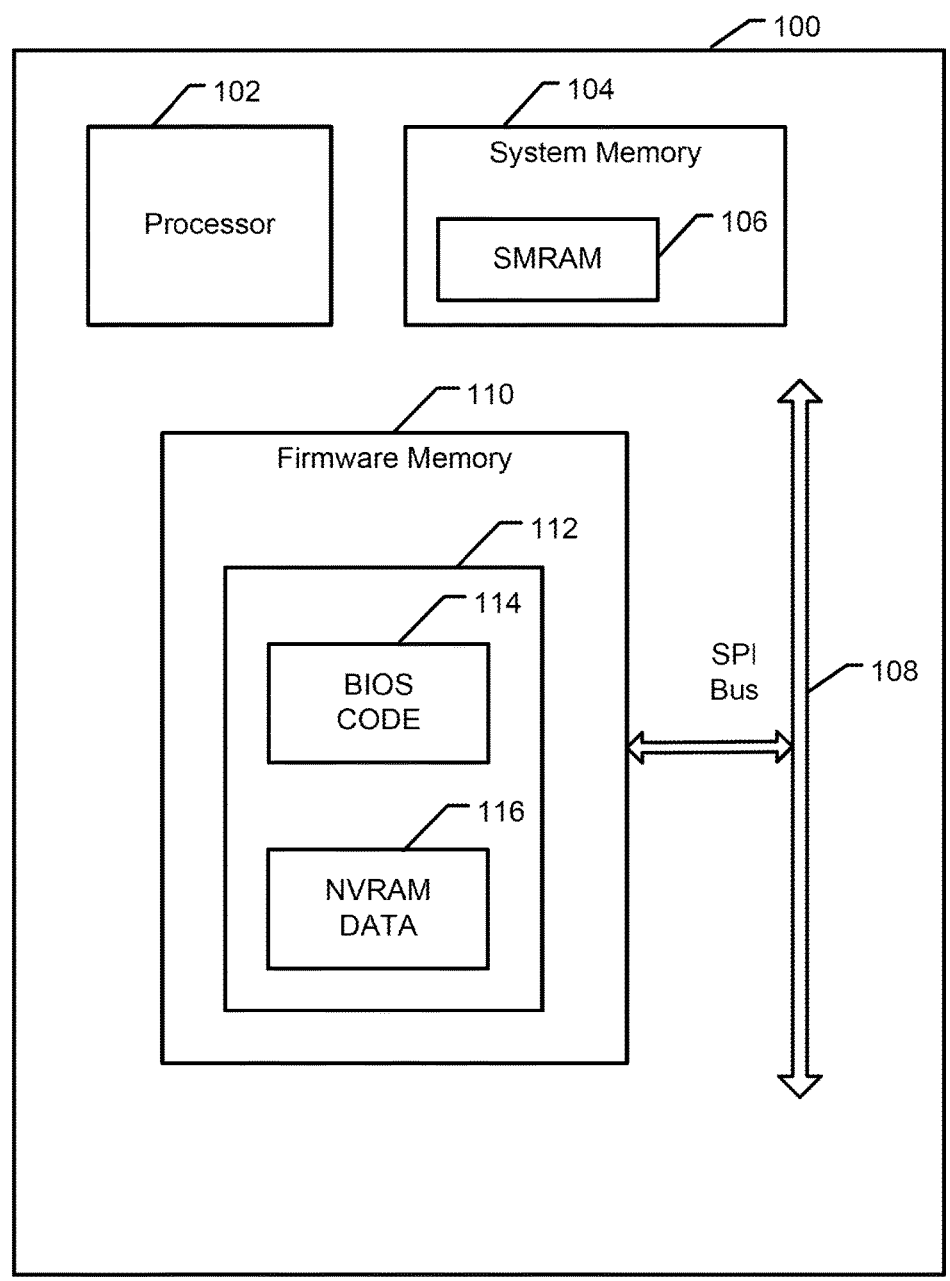
FIG. 1 is a block diagram illustrating an information handling according to a specific embodiment of the present disclosure.

FIG. 1 shows an information handling system 100 including a processor 102, system memory 104, a Serial Peripheral Interface (SPI) bus 108, and a firmware memory 110. System memory 104 includes a region allocated for use by system management software known as system management random access memory (SMRAM) 106. System 100 also includes a firmware memory 110. Firmware memory 110 can include a non-volatile random access memory (NVRAM), and is configured to store a firmware image 112. Firmware image 112 includes a region 114 for storing BIOS code and another region 116 for storing NVRAM data. BIOS code region 114 is configured to store instructions that are executable by processor 110, while NVRAM data region 116 includes data, such as environment variables. SPI bus 108 is a synchronous serial data link providing communications with embedded systems, sensors, and SD cards, firmware memory 100, and the like. While SPI bus 108 is illustrated at FIG. 1, another bus technology, such as an I2C bus, and the like, can be used to communicate with firmware memory 110 and other devices at system 100, such as a baseboard management controller (not shown at FIG. 1).

As disclosed herein, data to be stored at NVRAM data region 116 is first encrypted using a symmetric encryption key that is randomly generated for each store operation. The encrypted data and the encryption key are stored at NVRAM data region 116. The encryption key can be stored as plain text. In response to a request to retrieve data from NVRAM data region 116, the encrypted data stored at firmware memory 110 is decrypted using the associated encryption key. The encryption and decryption processes are performed transparently from the perspective of an operating system function, driver protocol, and the like, that initiated the request.

The information handling system can include additional hardware components and additional buses operable to transmit information between the various hardware components. For example, information handling system 100 can include one or more network interface controllers, peripheral component controllers and interconnects, video display controllers, and the like. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Firmware image 112 is historically referred to as a basic input/output system (BIOS), and the term BIOS is herein used interchangeably with the term firmware image, or simply firmware. Firmware image 112 is configured to initialize and test the hardware components of system 100, and to load a boot loader or an operating system (OS) from a mass storage device. Firmware image 112 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the firmware image 112 at the information handling system 100 can be substantially compliant with one or more revisions of the UEFI specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having configurable firmware and one or more firmware images 112.

The UEFI specification defines a set of runtime interfaces, serviced by the system BIOS, that allows drivers or an operating system (OS) to store and retrieve variables at NVRAM data 116. The runtime interfaces can operate in conjunction with UEFI interface protocols, and corresponding handlers, to store and retrieve variables from firmware memory 110, and NVRAM data region 116 in particular. Data stored at NVRAM data region 116 will persist across reboot of system 100. In addition, proprietary original equipment manufacturer (OEM) program code, similar to the UEFI get/set interfaces, can provide access to NVRAM data region 116. Software viruses and other malicious program code can utilize the interfaces to NVRAM data region 116 to inject malicious instructions into firmware memory 110. For example, malicious instruction can be stored at NVRAM data region 116, and another exploit can be used to force processor 102 to execute these instructions. By encrypting variables stored at NVRAM data 116, execution of the malicious instruction stored in this region is substantially prevented.

Access to NVRAM data region 116 is typically administered in response to a software system management interrupt (SMI). A SMI causes processor 102 to transition to a system management mode (SMM). SMM is an operating mode in which all normal execution, including the OS is suspended, and special software is executed in a high-privilege mode. SMM typically supports power management, system hardware control, or proprietary OEM program code. SMM is intended for use only by system firmware, not by applications software or general purpose software. SMM provides an isolated processor environment that operates transparently to the OS and software applications. SMM can only be entered in response to an SMI, which can be either hardware or software generated. A software-generated SMI is typically initiated by a write access to a specific input/output (I/O) port or memory location. Current processor state must be saved at SMRAM 106 before the SMI can be serviced. System 100 includes software to process SMIs and to dispatch service to an appropriate handling routine based on the source of the interrupt.

Figure 2:
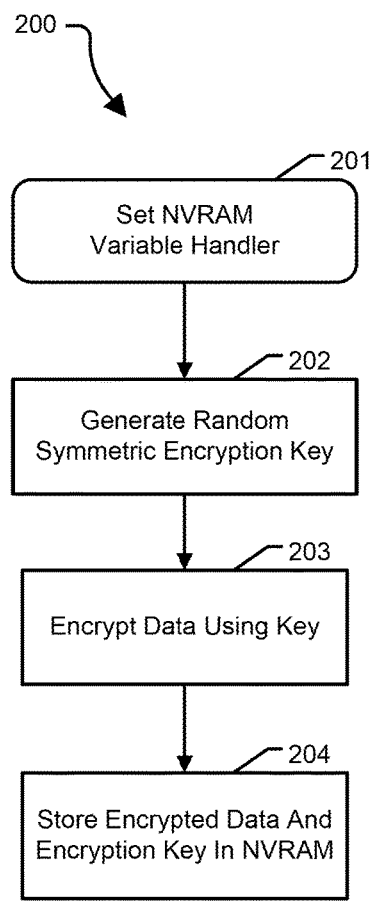
FIG. 2 is a flow diagram illustrating a method for encrypting variables for storage at a firmware memory according to a specific embodiment of the present disclosure.

FIG. 2 shows a flow diagram illustrating a method 200 for encrypting variables or other data for storage at a firmware memory according to a specific embodiment of the present disclosure. Method 200 begins at block 201 where execution of a handler to set a NVRAM variable is initiated. For example, a Windows library function, such as a SetFirmwareEnvironmentVariable, can be invoked by a program executing under the Windows operating system. The function can specify a variable name, and a data value to store at NVRAM data region 116 identified by the variable name. The function can utilize a UEFI protocol, such as UefiSetVariable, which invokes execution of a handler. Alternatively, during a driver execution environment (DXE) phase of a UEFI boot process, a driver can utilize the UEFI protocol to set a NVRAM variable. In still another example, an OEM can provide a proprietary interface for setting a NVRAM variable, such as during execution of a system management BIOS. One of skill will appreciate that the techniques for encrypting and decrypting NVRAM data disclosed herein are applicable to any interface for storing and retrieving data from a firmware memory, such as firmware memory 110.

Method 200 continues at block 202 where a random symmetric encryption key is generated. For example, the handler invoked at block 201 can include program code executable by processor 102 to generate the encryption key. The encryption key is referred to as a symmetric key because the same key is used to encrypt, and subsequently decrypt, the data value. The encryption key is randomly generated each time the set variable handler is called. The method proceeds to block 203 where the data received at block 201 is encrypted using the random symmetric key generated at block 202. Method 200 continues at block 204 where the encrypted data and the encryption key are stored, together, at the NVRAM. For example, the handler can associate each variable with a globally unique identifier (GUID) and/or a memory address, and a single GUID or address can be used to reference both the data variable and the corresponding encryption key. In one embodiment, the encryption key is stored as plain text. In other words, the key is not further encrypted or obfuscated.

Figure 3:
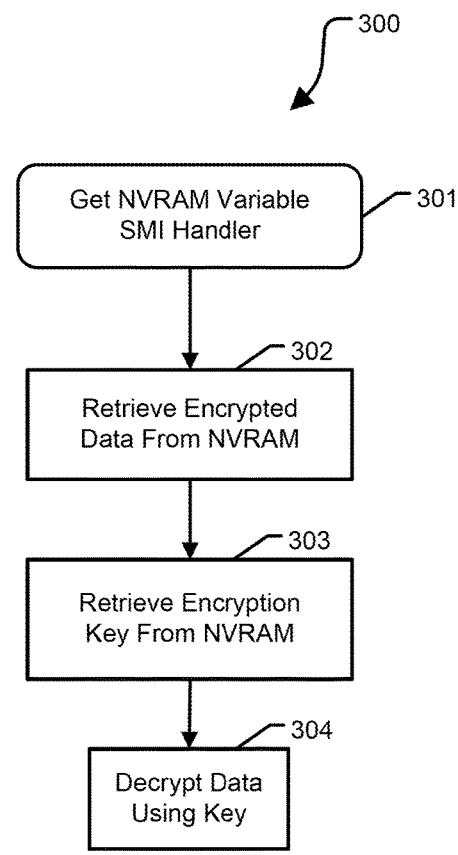
FIG. 3 is a flow diagram illustrating a method for decrypting variables stored at a firmware memory according to a specific embodiment of the present disclosure.

FIG. 3 shows a flow diagram illustrating a method 300 for decrypting variables stored at a firmware memory according to a specific embodiment of the present disclosure. Method 300 begins at block 301 where execution of a handler to get a NVRAM variable is initiated. For example, a Windows library function, such as a GetFirmwareEnvironmentVariable, can be invoked by a program executing under the Windows operating system. The function specifies a variable name identifying a data value to be retrieved from NVRAM data region 116. The function can utilize a UEFI protocol, such as UefiGetVariable, which invokes execution of a corresponding handler. Alternatively, during a driver execution environment (DXE) phase of a UEFI boot process, a driver can utilize the UEFI protocol to get a NVRAM variable. In still another example, an OEM can provide a proprietary interface for retrieving a NVRAM variable, such as during execution of a system management BIOS.

Method 300 continues at block 302 where encrypted data is retrieved from the NVRAM, and block 303 where a symmetric encryption key is retrieved. For example, the handler can determine an address corresponding to the desired variable, and fetch the encrypted data and the encryption key from NVRAM data 116 at the addressed location. The method proceeds to block 304 where the retrieved data is decrypted using the associated encryption key. The decrypted variable can now be forwarded to the function or protocol that make the original variable retrieval request. One of skill will appreciate that while the encrypted data and encryption key can be stored together, such as at a single address or identifer, the data and key can be linked by reference using another technique. For example, the BIOS can maintain a table to reference the encrypted data and the associated encryption key, a standard or proprietary data structure can maintain a relationship between the data and key, and the like. In an embodiment the encryption key is stored as plain text. Therefore the key does not require any special handling before using the key to decrypt the associated data.

Figure 4:
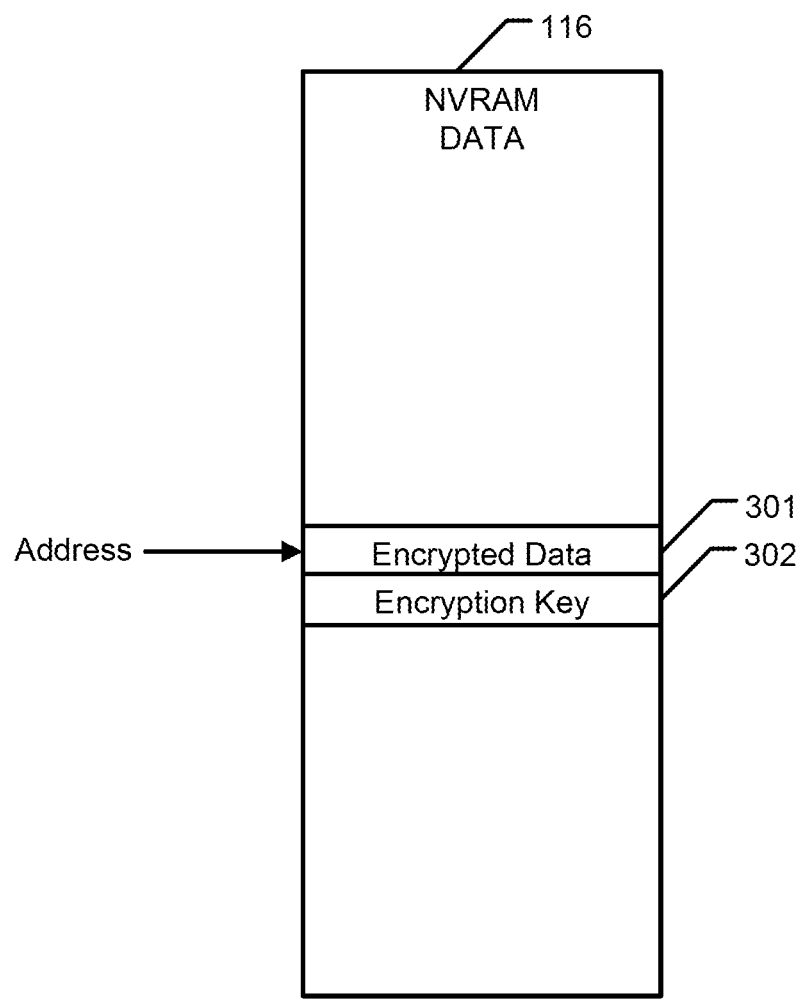
FIG. 4 is a block diagram illustrating the NVRAM Data of FIG. 1 according to a specific embodiment of the present disclosure.

FIG. 4 is a block diagram illustrating the NVRAM data region 116 of FIG. 1 according to a specific embodiment of the present disclosure. NVRAM data region 116 is a region of firmware memory 110 that is allocated for storage of data, such as environment variables and the like. As described above, handlers or other software functions or software routines for storing data at firmware memory 110 include a shim layer to first encrypt the data using a randomly generated symmetric encryption key. A new encryption key is generated for each store operation. The encrypted data 301 and the encryption key 302 are stored at NVRAM Data 116. In an embodiment, the encryption key is stored as plain text. Handlers or other software routines for retrieving data at firmware memory 110 include a shim layer to fetch encrypted data and a linked encryption key from firmware memory 110, decrypt the data using the key, and provide the decrypted data to the requesting entity. Because the key generation, encryption, and decryption is performed by a low-level handler, these actions are transparent to an operating system, higher-level data access functions, or protocols.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method to protect non-volatile random access memory (NVRAM) from malicious code, the method comprising:
   allocating, by a hardware processor of an information handling system, a first region at the NVRAM to store firmware instructions;
   allocating, by the hardware processor of the information handling system, a second region to store data that is not the firmware instructions; and
   receiving, by the hardware processor of the information handling system, the data to be stored at the second region, the receiving of the data in response to servicing a system management interrupt, the data received at a software function configured to store the data at the second region, the software function including operations for:
      generating a random symmetric encryption key;
      encrypting the data using the random symmetric encryption key to provide encrypted data, the random symmetric encryption key to only be associated with the data; and
      storing the encrypted data and the random symmetric encryption key at the second region at the NVRAM;
      wherein the encrypted data protects the second region at the NVRAM from executing the malicious code.

2. The method of claim 1, wherein the random symmetric encryption key is stored at the second region as plain text.

3. The method of claim 1, wherein the encrypted data and the random symmetric encryption key are linked by reference by a single globally unique identifier.

4. The method of claim 1, further comprising decrypting the encrypted data using the random symmetric encryption key in response to receiving a request to retrieve the data from the second region at the NVRAM.

5. The method of claim 1, further comprising receiving the data from a Windows library function after initialization of an operating system.

6. The method of claim 1, further comprising receiving the data from a unified extensible firmware interface protocol.

7. The method of claim 1, further comprising receiving the data during a driver initialization phase of a boot process at the information handling system.

8. The method of claim 1, wherein the encrypted data and the random symmetric encryption key are referenced at the NVRAM by a single memory address.

9. The method of claim 1, further comprising:
   receiving a request to retrieve the data from the second region at the NVRAM;
   retrieving the encrypted data from the second region at the NVRAM;
   retrieving the random symmetric encryption key from the second region at the NVRAM;
   decrypting the encrypted data using the random symmetric encryption key to unencrypt the data; and
   providing the data to fulfill the request.

10. The method of claim 1, wherein the data is an environment variable.

11. The method of claim 1, wherein the function for the write operations is configured to prevent execution of malicious code stored at the second region.

12. An information handling system comprising:
    a processor;
    a system memory device; and
    a non-volatile firmware memory device including a first region for storing basic input/output system (BIOSE code and a second region for storing data that is not the BIOS code, the BIOS code executing store operations to the second region, the store operations to further:
       receive the data to be stored at the second region of the non-volatile firmware memory device, the data received in response to servicing a system management interrupt;
       generate a random symmetric encryption key for each different store operation of the store operations executed by the BIOS code;
       encrypt the data using the random symmetric encryption key to provide encrypted data that corresponds to the each different store operation; and
       store the encrypted data and the generated random symmetric encryption key at the second region of the non-volatile firmware memory device.

13. The information handling system of claim 12, further comprising instructions to decrypt the encrypted data using the random symmetric encryption key in response to receiving a request to retrieve the data from the second region.

14. The information handling system of claim 12, wherein the encrypted data and the random symmetric encryption key are linked by reference by a single identifier.

15. The information handling system of claim 12, wherein the random symmetric encryption key is stored as plain text.

16. The information handling system of claim 12, wherein the store operations are configured to prevent execution of malicious code stored at the second region.

17. A non-transitory data storage medium storing instructions executable by a processor to cause the processor to:
    allocate a first region of a non-volatile firmware memory to store BIOS code;
    allocate a second region of the non-volatile firmware memory to store data that is not the BIOS code; and
    implement a function for write operations to the second region of the non-volatile firmware memory, the function for the write operations configured to:
       receive the data in response to servicing a system management interrupt at the processor;

generate a different random symmetric encryption key for each corresponding one of the write operations to the second region of the non-volatile firmware memory;

encrypt the data using the different random symmetric encryption key to provide encrypted data for the corresponding one of the write operations to the second region of the non-volatile firmware memory; and store the encrypted data and the different random symmetric encryption key at the second region of the non-volatile firmware memory for the corresponding one of the write operations.

18. The non-transitory data storage medium of claim 17, further comprising instructions to:

receive a request to retrieve the data from the second region;

retrieve the encrypted data;

retrieve the different random symmetric encryption key;

decrypt the encrypted data using the different random symmetric encryption key to unencrypt the data; and provide the unencrypted data to fulfill the request.

19. The non-transitory data storage medium of claim 17, wherein the different random symmetric encryption key is stored as plain text.

\* \* \* \* \*